Patented Aug. 8, 1933

1,921,773

UNITED STATES PATENT OFFICE 1,921,773

PROCESS FOR THE PRODUCTION OF ZINC SULPHATE

Kurt J. Petschow, Passaic, N. J., assignor to Royce Chemical Company, Carlton Hill, N. J., a Corporation of New Jersey No Drawing. Application December 6, 1930
Serial No. 500,677

8 Claims. (Cl. 23—125)

My invention relates to the production of zinc sulphate and its separation from impurities and refers particularly to processes for the production of commercial, or chemically pure, zinc sulphate from sludges containing zinc salts obtained from the production of sodium sulphoxylate formaldehyde or of other chemicals.

In the production of sodium formaldehyde sulphoxylate sludges are produced containing large quantities of zinc salts which are, however so intermixed with other organic and inorganic compounds that it has been found practically impossible to obtain the zinc salts in the form of zinc sulphate in a state of purity which will render it valuable as a commercial product.

This difficulty is especially evident in attempts to produce practically and commercially pure zinc sulphate from the sludges resulting from the production of sodium formaldehyde sulphoxylate and hence these sludges accumulate rapidly as products possessing little or no value.

It is evident that if these sludges can be employed as a raw material for the economic production of soluble zinc sulphate, the cost of the sulphoxylate will be reduced and the accumulation of the sludges will be avoided.

Notwithstanding the great variety of undesirable compounds, both organic and inorganic, present in these sludges, I have found it possible to obtain practically all of the zinc compounds in the form of zinc sulphate of such purity as to be practically chemically pure and at a cost of production below the market price of zinc sulphate thus materially reducing the cost of production of the sulphoxylates.

The process of my invention accomplishes these desirable results and consists generally, besides the oxides, in converting and destroying the complex salts and other salts into their oxides, removing the soluble compounds, both organic and inorganic, and converting the zinc compounds into pure zinc sulphate. The zinc sludge from the sodium sulphoxylate formaldehyde, consists mostly of zinc oxide or zinc carbonate with the impurities which are first already in the used zinc dust, such as iron, copper, lead, cadmium; second, with the impurities which come in by manufacture of sodium sulphoxylate formaldehyde, such as zinc sulphide, free sulphur, sodium bisulphite, sodium sulphate, complex salts of zinc sulphoxylate formaldehyde, and formaldehyde compounds.

While the quantities of chemicals used in my process naturally vary with the character and contents of the sludge employed, the steps of my process are in general as follows:—

The sludge is brought into a suitable kettle, water is added, heat is applied and made alkaline by the addition of hydrated lime or ammonia or other suitable alkaline compounds, and air is introduced into the mass under the constant agitation. The insoluble compounds are then separated from the soluble compounds preferably by filtering. This step of my process removes partly the soluble compounds and partially oxidizes and destroys the complex salts and other salts.

Water is then added to the sludge and a small amount of acid, preferably sulphuric acid is then added to the sludge and air is blown into the mass during constant agitation and heated. The sludge is then filtered or decanted and washed with water. This step oxidizes and destroys practically all of the complex salts to their oxides and removes further soluble compounds which may be present.

Water is added to the sludge to allow formed sulphates to dissolve, sulphuric acid is then added to the sludge with thorough agitation, which forms zinc sulphate solution and the sulphates of other heavy metals if they be present as impurities.

If there be any heavy metal salts present in addition to the zinc sulphate, as salts of iron, the solution is neutralized by means of calcium carbonate and hydrogen peroxide is added to convert the ferrous sulphates to ferric sulphates.

Lime and calcium carbonate are then added and stirred. This precipitates the hydrates of the heavy metals such as ferric hydrate. The mixture is then filtered.

By the process of my invention, I produce practically pure zinc sulphate from sludges of the character described, a result that has been previously considered impossible, and I can thus convert useless and objectionable sludges into a chemical compound of commercial value.

I do not limit myself to the particular chemicals nor to the particular steps of procedure described as these are given simply as a means for clearly describing the process of my invention.

What I claim is:—

1. In a process for the production of zinc sulphate solution from sludges containing zinc salts, such as from sludges obtained from the production of sodium sulphoxylate formaldehyde, the steps which comprise destroying the complex salts, by adding water to the sludge, heating the mass, agitating, passing air through the mass; thus breaking up the complex salts like zinc sulphoxylate formaldehyde, into soluble and insoluble products, removing the water soluble compounds like sodium bisulphite, sodium sulphate, treating and dissolving the sludge with sulphuric acid so as to convert the zinc oxide into zinc sulphate and separating the zinc sulphate solution by means of filtering.

2. In a process for the production of zinc sulphate solution from sludges containing zinc salts, such as from sludges obtained from the production of sodium sulphoxylate formaldehyde, the steps which comprise adding water to the sludge, heating the mass with steam, treating the sludge with a current of air, adding a small amount of acid thereto, treating the thus produced mixture with a current of air, removing the water soluble compounds, treating and dissolving the sludge with sulphuric acid, and separating the zinc sulphate solution by means of filtering.

3. In a process for the production of zinc sulphate solution from sludges containing zinc salts such as from sludges obtained from the production of sodium sulphoxylate formaldehyde, the steps which comprise adding water to the sludge, heating the mass with steam, adding hydrated lime or ammonia, treating the alkaline sludge with a current of air, removing the water soluble compounds, adding a small amount of acid thereto, treating the thus produced mixture with a current of air, removing the water soluble compounds adding water to the sludge to allow formed sulphates to dissolve, treating and dissolving the sludge with sulphuric acid, and separating the zinc sulphate solution by means of filtering.

4. In a process for the production of zinc sulphate solution from sludges containing zinc salts, such as from sludges obtained from the production of sodium sulphoxylate formaldehyde, previously mentioned, the steps which comprise destroying the complex salts, by adding water to the sludge, heating the mass with steam, agitating, passing air through the mass thus breaking up the complex salts like zinc sulphoxylate formaldehyde into soluble and insoluble products, removing the water soluble compounds, converting the zinc oxide into zinc sulphate solution by treating and dissolving the sludge with sulphuric acid, neutralize the sludge with calcium carbonate, adding hydrogen peroxide, precipitating the heavy metals with calcium carbonate and filtering the zinc sulphate solution.

5. In a process for the production of zinc sulphate solution from sludges containing zinc salts, such as from sludges obtained from the production of sodium sulphoxylate formaldehyde, the steps which comprise adding water to the sludge, heating the mass with steam, treating the sludge with a current of air, adding a small amount of acid, preferably sulphuric acid thereto, treating the thus produced mixture with a current of air, removing the water soluble compounds, adding water to the sludge to allow formed sulphates to dissolve, treating and dissolving the sludge with sulphuric acid, precipitating the heavy metals and separating the zinc sulphate solution by filtration from the precipitating salts of the heavy metals.

6. In a process for the production of zinc sulphate solution from sludges containing zinc salts, such as from sludges obtained from the production of sodium sulphoxylate formaldehyde, the steps which comprise, adding water to the sludge, heating the mass with steam, treating the sludge with a current of air, removing the liquid from the mass, adding water to the sludge and adding a small amount of sulphuric acid, heating, treating said mass with a current of air, filtering and washing the thus produced mass, adding water to the sludge to allow formed sulphates to dissolve, treating and dissolving same with sulphuric acid and filtering the thus formed zinc sulphate solution.

7. In a process for the production of zinc sulphate solution from sludges containing zinc salts, such as from sludges obtained from the production of sodium sulphoxylate formaldehyde, the steps which comprise, adding water to the sludge, treating the mass by means of steam, treating the sludge with a current of air, removing the liquid from the mass, adding water and a small amount of sulphuric acid to the sludge, heating, treating said mass with a current of air, filtering and washing the thus produced mass, adding water to the sludge to allow formed sulphates to dissolve, treating and dissolving same with sulphuric acid, neutralize with calcium carbonate, adding peroxide to the mixture, precipitating the salts of the heavy metals with a solution of a member of the group of salts consisting of calcium carbonate and calcium hydrate, filtering the mixture and crystallizing the zinc sulphate solution from the filtrate.

8. In a process for the production of zinc sulphate solution from sludges containing zinc salts, such as from sludges obtained from the production of sodium sulphoxylate formaldehyde, the steps which comprise, adding water to the sludge, heating the mass with steam, adding an alkali, treating the alkaline sludge with a current of air, removing the liquid from the mass, adding a small amount of sulphuric acid, heating with steam, treating said mass with a current of air, filtering the thus produced mass and washing it with water, adding water to the sludge to allow formed sulphates to dissolve, treating and dissolving the sludge with sulphuric acid, neutralizing the zinc sulphate solution with calcium carbonate, adding peroxide to the mixture, precipitating the salts of the heavy metals by adding a solution of a member of the group of salts consisting of calcium carbonate and calcium hydrate, filtering the mixture from the residue and crystallizing the zinc sulphate solution from the filtrate.

KURT J. PETSCHOW.